US008819686B2

(12) United States Patent
Memik et al.

(10) Patent No.: US 8,819,686 B2
(45) Date of Patent: Aug. 26, 2014

(54) SCHEDULING THREADS ON DIFFERENT PROCESSOR CORES BASED ON MEMORY TEMPERATURE

(75) Inventors: Gokhan Memik, Evanston, IL (US); Seda Ogrenci Memik, Evanston, IL (US); Bill Mangione-Smith, Kirkland, WA (US)

(73) Assignee: Empire Technology Development LLC, Wilmington, DE (US)

( * ) Notice: Subject to any disclaimer, the term of this patent is extended or adjusted under 35 U.S.C. 154(b) by 830 days.

(21) Appl. No.: 12/507,952

(22) Filed: Jul. 23, 2009

(65) Prior Publication Data

US 2011/0023039 A1    Jan. 27, 2011

(51) Int. Cl.
G06F 9/46 (2006.01)
(52) U.S. Cl.
USPC .......................................... 718/102
(58) Field of Classification Search
CPC combination set(s) only.
See application file for complete search history.

(56) References Cited

U.S. PATENT DOCUMENTS

| | | | |
|---|---|---|---|
| 5,898,870 A | 4/1999 | Okunda et al. | |
| 5,930,511 A | 7/1999 | Hinsley | |
| 6,021,076 A * | 2/2000 | Woo et al. ..................... | 365/211 |
| 6,298,370 B1 | 10/2001 | Tang et al. | |
| 6,772,352 B1 | 8/2004 | Williams et al. | |
| 7,412,353 B2 | 8/2008 | Borkar et al. | |
| 7,516,344 B2 | 4/2009 | Kato et al. | |
| 7,596,430 B2 | 9/2009 | Aguilar, Jr. et al. | |
| 7,770,176 B2 * | 8/2010 | Maeda et al. ................. | 718/105 |
| 7,917,905 B2 * | 3/2011 | Itoh ............................... | 718/102 |
| 7,954,101 B2 * | 5/2011 | Adachi et al. ................. | 718/102 |
| 8,161,304 B2 * | 4/2012 | Hamilton ....................... | 713/320 |
| 2002/0112097 A1 | 8/2002 | Milovanovic et al. | |
| 2004/0193778 A1 | 9/2004 | Ishikawa et al. | |
| 2004/0199730 A1 | 10/2004 | Eggers et al. | |
| 2005/0120252 A1 | 6/2005 | Uwatoko | |

(Continued)

FOREIGN PATENT DOCUMENTS

CN         1993765 A      7/2007
CN       101275977 A     10/2008

(Continued)

OTHER PUBLICATIONS

Unsal, O. S., J. W. Tschanz, K. Bowman, V. De, X. Vera, A. Gonzalez, and O. Ergin, "Impact of Parameter Variations on Circuits and Microarchitecture." IEEE Micro, Nov.-Dec. 2006. 26(6): pp. 30-39.

(Continued)

Primary Examiner — Meng An
Assistant Examiner — Eric C Wai
(74) Attorney, Agent, or Firm — Moritt Hock & Hamroff LLP; Steven S. Rubin, Esq.

(57) ABSTRACT

Techniques for scheduling a thread running in a computer system are disclosed. Example computer systems may include but are not limited to a multiprocessor having first and second cores, an operating system, and a memory bank for storing data. The example methods may include but are not limited to measuring a temperature of the memory bank and determining whether the thread includes a request for data stored in the memory bank, if the temperature of the memory bank exceeds a predetermined temperature. The methods may further include but are not limited to slowing down the execution of the thread upon determining if the thread includes a request for data.

20 Claims, 4 Drawing Sheets

(56) References Cited

U.S. PATENT DOCUMENTS

| | | |
|---|---|---|
| 2005/0172289 A1 | 8/2005 | Klingman |
| 2006/0002217 A1 | 1/2006 | Walker et al. |
| 2006/0021076 A9 | 1/2006 | Wangh |
| 2006/0070074 A1 | 3/2006 | Maeda |
| 2007/0191993 A1 | 8/2007 | Wyatt |
| 2007/0282572 A1 | 12/2007 | Larus |
| 2007/0294693 A1 | 12/2007 | Barham |
| 2008/0005539 A1 | 1/2008 | Velhal et al. |
| 2008/0103634 A1 | 5/2008 | Santos et al. |
| 2008/0120485 A1 | 5/2008 | Rothman et al. |
| 2008/0234953 A1 | 9/2008 | Ignowski et al. |
| 2009/0055580 A1 | 2/2009 | Moscibroda et al. |
| 2009/0217286 A1 | 8/2009 | Schmidbauer |
| 2010/0250792 A1 | 9/2010 | Harriman et al. |

FOREIGN PATENT DOCUMENTS

| | | |
|---|---|---|
| CN | 101278264 A | 10/2008 |
| JP | 2002189628 | 7/2002 |
| JP | 2004355435 A | 12/2004 |
| JP | 2005165470 A | 6/2005 |
| JP | 2005174203 A | 6/2005 |
| JP | 2006209525 A | 8/2006 |
| JP | 2007265393 A | 10/2007 |
| JP | 2008112452 | 5/2008 |
| JP | 2009510618 A | 3/2009 |

OTHER PUBLICATIONS

M. Goudarzi, T. Ishihara, H. Yasuura, "A Software Technique to Improve Yield of Processor Chips in Presence of Ultra-Leaky SRAM Cells Caused by Process Variation," In Proc. of Asia and South-Pacific Design Automation Conference (ASP-DAC'07), Japan, Jan. 2007, pp. 878-883.

Bjorn De Sutter, Variability-Aware PrOgram Relocation Project, Sep. 2008 (www.hipeac.net/system/files/PhDVAPOR_eng.pdf), 5 pages.

M. Goudarzi, T. Ishihara, Hiroto Yasuura, "Variation Aware Compilation for Improving Energy-Efficiency of Nanometer Processor Caches," Workshop on Compiler-Assisted SoC Assembly (CASA'06), Seoul, Oct. 27, 2006 (http://www.slrc.kyushu-u.ac.jp/~ishihara/CREST/CASA2006.pdf), 47 pages.

Memik, G. et al., "Self-Adjusting Architectures for Improved Performance, Yield, and Reduced Design Time", (http://www.eecs.northwestern.edu/~memik/proiects/selfadjusting/index.html), May 13, 2010, 4 pages.

L. Zhang, L. Bai, R. P. Dick, L. Shang, and R. Joseph, "Process variation characterization of chip-level multiprocessors," in Proc. of Design Automation Conference (DAC), San Francisco, CA, Jul. 2009, 4 pages.

G. Memik, S. Memik, Y. Ismail, and R. Joseph, "Self-Adjusting Architectures/Circuits for Improved Performance and Reduced Design Complexity", NSF Grant #0541337, Apr. 2006, http://www.nsf.gov/awardsearch/showAward.do?AwardNumber=0541337, 4 pages.

M. Santambrogio, M. Giani, S. Ogrenci Memik, "Managing Reconfigurable Resources in Heterogeneous Cores using Portable Pre-Synthesized Templates", in Proc. International Symposium on System-on-Chip, Nov. 19-21, 2007, Tampere, Finland, 4 pages.

Y. Pan, J. Kong, S. Ozdemir, G. Memik, S. W. Chung, "Selective Wordline Voltage Boosting for Caches to Manage Yield under Process Variations", in Proc. of Design Automation Conference (DAC), San Francisco, CA, Jul. 2009, pp. 1-6.

A. Das, B. Ozisikyilmaz, S. Ozdemir, G. Memik, J. Zambreno, A. Choudhary, "Evaluating the Effects of Cache Redundancy on Profit", in Proc. of International Symposium on Microarchitecture (MICRO), Lake Como, Italy, Nov. 2008, pp. 1-11.

A. Mallik, Y. Zhang, G. Memik, "Automated Task Distribution in Multicore Network Processors using Statistical Analysis", in Proc. of International Symposium on Architectures for Networking and Communications Systems (ANCS), Orlando, FL, Dec. 2007, pp. 67-76.

S. Ozdemir, J. C. Ku, A. Mallik, G. Memik, Y. Ismail, "Variable Latency Caches for Nanoscale Processor", in Proc. of Conference for High Performance Computing, Networking, Storage and Analysis (SC), Reno, NV, Nov. 2007, 10 pages.

A. Das, S. Ozdemir, G. Memik, A. Choudhary, "Evaluating Voltage Islands in CMPs under Process Variations", in Proc. of 25th International Conference on Computer Design (ICCD), Lake Tahoe, CA, Oct. 2007, 8 pages.

B. Lin, A. Mallik, P. Dinda, G. Memik, R. Dick, "Power Reduction Through Measurement and Modeling of Users and CPUs", in Proc. of International Conference on Measurement and Modeling of Computer Systems (SIGMETRICS), San Diego, CA, Jun. 2007, 2 pages.

A. Das, S. Ozdemir, G. Memik, Joseph Zambreno and A. Choudhary, "Mitigating the Effects of Process Variations: Architectural Approaches for Improving Batch Performance", in Proc. of Workshop on Architectural Support for Gigascale Integration (ASGI) held in conjunction with International Symposium on Computer Architecture (ISCA), San Diego, CA, Jun. 2007, 11 pages.

Abhishek Das, Serkan Ozdemir, Gokhan Memik, Joseph Zambreno and Alok Choudhary, "Microarchitectures for Managing Chip Revenues under Process Variations", IEEE Computer Architecture Letters (CAL), vol. 6, Jun. 2007, pp. 1-4.

S. Ozdemir, D. Sinha, G. Memik, J. Adams, H. Zhou, "Yield-Aware Cache Architectures", in Proc. of International Symposium on Microarchitecture (MICRO), Orlando, FL, Dec. 2006, 11 pages.

J. Long, S. O. Memik, G. Memik, R. Mukherjee, "Thermal Monitoring Mechanisms for Chip Multiprocessors", ACM Transactions on Architecture and Code Optimization (TACO), vol. 5, No. 2, Aug. 2008, pp. 9:1 through 9:33.

S. Liu, Y. Zhang, S. Ogrenci Memik, G. Memik, "An Approach for Adaptive DRAM Temperature and Power Management", in Proc. of International Conference on Supercomputing (ICS), Island of Kos, Greece, Jun. 2008, pp. 63-72.

S. Liu, Y. Zhang, S. Ogrenci Memik, G. Memik, "A Power and Temperature Aware DRAM Architecture", in Proc. of Design Automation Conference (DAC), Anaheim, CA, Jun. 2008, 6 pages.

R. Mukherjee, S. Ogrenci Memik, "Physical Aware Frequency Selection for Dynamic Thermal Management in Multi-Core Systems", in Proc. of IEEE/ACM International Conference on Computer-Aided Design (ICCAD), Nov. 5-9, 2006, San Jose, CA, pp. 547-552.

Iyer, J. et al., "System Memory Power and Thermal Management in Platforms Built on Intel® Centrino® Duo Mobile Technology", Intel® Technology Journal, vol. 10, Issue 02, May 15, 2006, pp. 123-132.

Zhu, Q. et al., "Thermal Managerment of High Power Memory Module for Server Platforms", IEEE, 2008, pp. 572-576.

Canturk Isci, Alper Buyuktosunoglu, Chen-Yong Cher, Pradip Bose, Margaret Martonosi, "An Analysis of Efficient Multi-Core Global Power Management Policies: Maximizing Performance for a Given Power Budget", MICRO 2006: 347-358.

Abella, J., Vera, X., Gonzalez, A., "Penelope: The NBTI-Aware Processor", MICRO 2007, pp. 85-96.

Kevin Brownell, Gu-Yeon Wei and David Brooks. "Evaluation of Voltage Interpolation to Address Process Variations," International Conference on Computer Aided Design (ICCAD), San Jose, CA, Nov. 2008, 8 pages.

Xiaoyao Liang, Gu-Yeon Wei, and David Brooks. "ReVIVaL: A Variation-Tolerant Architecture Using Voltage Interpolation and Variable Latency," 35th International Symposium on Computer Architecture (ISCA-35), Beijing, China, Jun. 2008, 12 pages.

Xiaoyao Liang and David Brooks. "Mitigating the Impact of Process Variations on Processor Register Files and Execution Units," 39th International Symposium on Microarchitecture (MICRO-39), Orlando, FL, Dec. 2006, 11 pages.

Abhishek Tiwari, Smruti Sarangi, and Josep Torrellas, "ReCycle: Pipeline Adaptation to Tolerate Process Variation", 34th Annual International Symposium on Computer Architecture (ISCA), Jun. 2007, 12 pages.

Bowman, K.A., Duvall, S.G., Meindl, J.D., "Impact of die-to-die and within-die parameter fluctuations on the maximum clock frequency distribution", ISSCC 2001, pp. 278-279.

(56) References Cited

OTHER PUBLICATIONS

S. Borkar, "Designing reliable systems from unreliable components: the challenges of transistor variability and degradation", IEEE Micro, 2005, pp. 10-16.
P. Ndai et al., "Within-Die Variation-Aware Scheduling in Superscalar Processors for Improved Throughput", IEEE Transactions on Computers, 2008, pp. 940-951.
Michael D. Powell, Arijit Biswas, Shantanu Gupta, and Shubhendu S. Mukherjee, "Architectural Core Salvaging in a Multi-Core Processor for Hard-Error Tolerance", in Proc. of International Symposium on Computer Architecture (ISCA), Austin, TX, Jun. 2009, 12 pages.
Ke Meng, Russ Joseph, "Process variation aware cache leakage management", ISLPED 2006: 262-267.
Ke Meng, Frank Huebbers, Russ Joseph, Yehea Ismail, "Modeling and Characterizing Power Variability in Multicore Architectures", ISPASS 2007: 146-157.
Ke Meng, Frank Huebbers, Russ Joseph, and Yehea Ismail, "Physical Resource Matching Under Power Asymmetry", in Proc. of P=ac2 2006, pp. 1-10.
Ke Meng, Russ Joseph, Robert P. Dick, Li Shang, "Multi-optimization power management for chip multiprocessors", PACT 2008: 177-186.
Somnath Paul, Saibal Mukhopadhyay and Swarup Bhunia, "A Variation-Aware Preferential Design Approach for Memory Based Reconfigurable Computing," in IEEE International Conference on Computer Aided Design (ICCAD), 2009, pp. 180-183.
J.A. Winter and D.H. Albonesi, "Scheduling Algorithms for Unpredictably Heterogeneous CMP Architectures", in Proc. of 38th International Conference on Dependable Systems and Networks, Jun. 2008, 10 pages.
Eren Kursun and Chen-Yong Cher, "Variation-aware thermal characterization and management of multi-core architectures", in Proc. of ICCD 2008, pp. 280-285.
Ulya R. Karpuzcu, Brian Greskamp and Josep Torrellas, "The BubbleWrap Many-Core: Popping Cores for Sequential Acceleration", International Symposium on Microarchitecture (MICRO), Dec. 2009, 12 pages.
Smruti Sarangi, Brian Greskamp, Abhishek Tiwari, and Josep Torrellas, "EVAL: Utilizing Processors with Variation-Induced Timing Errors", 41st International Symposium on Microarchitecture (MICRO), Nov. 2008, 12 pages.
Radu Teodorescu and Josep Torrellas, "Variation-Aware Application Scheduling and Power Management for Chip Multiprocessors", 35th Annual International Symposium on Computer Architecture (ISCA), Jun. 2008, 12 pages.
Bower F. A., Sorin D. J., and Cox L. P., "The Impact of Dynamically Heterogeneous Multicore Processors on Thread Scheduling", IEEE Micro 28, 3. May 2008, pp. 17-25.
Tam D., Azimi R., and Stumm M., "Thread clustering: sharing-aware scheduling on SMP-CMP-SMT multiprocessors", In Proceedings of the Sigops/Eurosys European Conference on Computer Systems. Lisboa, Portugal. Mar. 2007, 12 pages.
Anderson J.H., Calandrino J.M., Devi U.C., "Real-Time Scheduling on Multicore Platforms", In Proceedings of the Real-Time and Embedded Technology and Applications Symposium. Apr. 2006, 12 pages.
Durbhakula M., "Sharing-aware OS scheduling algorithms for multi-socket multi-core servers", In Proceedings of the international Forum on Next-Generation Multicore/Manycore Technologies. Cairo, Egypt. Nov. 2008, 10 pages.
Siddha S., Pallipadi V., Mallick A., "Process Scheduling Challenges in the Era of Multi-Core Processors", Intel® Technology Journal. Nov. 2007, 361-370.
Li T., Baumberger D., and Hahn S., "Efficient and scalable multiprocessor fair scheduling using distributed weighted round-robin", In Proceedings of the Symposium on Principles and Practice of Parallel Programming. Raleigh, NC. Feb. 2009, pp. 1-10.
Rajagopalan M., Lewis B. T., and Anderson T. A., "Thread scheduling for multi-core platforms", In Proceedings of the USENIX Workshop on Hot Topics in Operating System. San Diego, CA. May 2007, 9 pages.
El-Moursy A., Garg R., Albonesi D.H., Dwarkadas S., "Compatible phase co-scheduling on a CMP of multi-threaded processors", In Proceedings of the Parallel and Distributed Processing Symposium. Apr. 2006, pp. 1-10.
Puppin D., Stephenson M., Amarasinghe S., Martin M., and O'reilly U., "Adapting convergent scheduling using machine-learning", In proceedings of the International workshop on languages and compilers for parallel computing. Oct. 2003, 15 pages.
Negi A., Kishore K.P. "Applying Machine Learning Techniques to Improve Linux Process Scheduling", IEEE TENCON. Nov. 2005, 6 pages.
Wang Z., and O'Boyle M. F., "Mapping parallelism to multi-cores: a machine learning based approach", In Proceedings of the Symposium on Principles and Practice of Parallel Programming. Raleigh, NC. Feb. 2009, 10 pages.
Tucker A., and Gupta A., "Process control and scheduling issues for multiprogrammed shared-memory multiprocessors", In Proceedings of the Symposium on Operating Systems Principles. 1989, pp. 159-166.
Jiang Lin, Hongzhong Zheng, Zhichun Zhu, Eugene Gorbatov, Howard David, Zhao Zhang, "Software thermal management of dram memory for multicore systems", SIGMETRICS 2008: 337-348.
Jiang Lin, Hongzhong Zheng, Zhichun Zhu, Howard David, Zhao Zhang, "Thermal modeling and management of DRAM memory systems", ISCA 2007: 312-322.
Hongzhong Zheng, Jiang Lin, Zhao Zhang, Eugene Gorbatov, Howard David, Zhichun Zhu, "Mini-rank: Adaptive DRAM architecture for improving memory power efficiency", MICRO 2008: 210-221.
Hongzhong Zheng, Jiang Lin, Zhao Zhang, Zhichun Zhu, "Memory Access Scheduling Schemes for Systems with Multi-Core Processors", ICPP 2008: 406-413.
Hongzhong Zheng, Jiang Lin, Zhao Zhang, Zhichun Zhu, "Decoupled DIMM: building high-bandwidth memory system using low-speed DRAM devices", ISCA 2009: 255-266.
Engin Ipek, Onur Mutlu, José F. Martínez, and Rich Caruana, "Self Optimizing Memory Controllers: A Reinforcement Learning Approach", Proceedings of the 35th International Symposium on Computer Architecture (ISCA), pp. 39-50, Beijing, China, Jun. 2008.
Russ Joseph, "Exploring Salvage Techniques for Multi-core Architectures", HPCRI-2005 Workshop in Conjunction with HPCA-2005, 6 pages.
Seda Memik, Gokhan Memik, "SHF: Small: Thermal-Aware High-Performance DRAM Architectures in Multicore Technologies", NSF Grant# 0916746, Sep. 2009, 2 pages.
Gokhan Memik, "CAREER: Holistic Computer Architectures for Nanoscale Processors", NSF Grant#0747201, Apr. 2008, 3 pages.
Sahoo, S.K., et al., "Using Likely Program Invariants to Detect Hardware Errors", Appears in Proceedings of the 38th International Conference on Dependable Systems and Networks (DSN), Jun. 2008, pp. 1-10.
Ernst, D. et al., "Razor: A Low-Power Pipeline Based on Circuit-Level Timing Speculation", Appears in the 36th Annual International Symposium on Microarchitecture (MICRO-36), 12 pages, Dec. 2003.
Choi, J. et al., "Thermal-aware Task Scheduling at the System Software Level", ISLPED '07, Aug. 27-29, 2007, Portland, OR, pp. 213-218.
B. Lin, A. Mallik, P. Dinda, G. Memik, R. Dick, "User- and Process-Driven Dynamic Voltage and Frequency Scaling", in Proc. of International Symposium on Performance Analysis of Systems and Software (ISPASS), Boston, MA, Apr. 2009, 12 pages.
Abhishek Das, David Nguyen, Joseph Zambreno, Gokhan Memik, Alok Choudhary, "An FPGA-based Network Intrusion Detection Architecture", IEEE Transactions on Information Forensics and Security (TIFS), vol. 3, Issue 1, Mar. 2008, pp. 118-132.
S. Pati, R. Narayanan, G. Memik, A. Choudhary, J. Zambreno, "Design and Implementation of an FPGA Architecture for High-

(56) References Cited

OTHER PUBLICATIONS

Speed Network Feature Extraction", in Proc. of International Conference on Field-Programmable Technology (FPT), Kitakyushu, Japan, Dec. 2007, 8 pages.

D. Nguyen, A. Das, G. Memik, A. Choudhary, "A Reconfigurable Architecture for Network Intrusion Detection using Principal Component Analysis", in Proc. of Fourteenth International Symposium on Field-Programmable Gate Arrays (FPGA), Monterey, CA, Feb. 2006, 2 pages.

D. Nguyen, G. Memik, S. Ogrenci Memik, A. Choudhary, "Real-Time Feature Extraction for High Speed Networks", in Proc. of International Conference on Field Programmable Logic and Applications (FPL), Tampere, Finland, Aug. 2005.

D. Nguyen, J. Zambreno, G. Memik, "Flow Monitoring in High-Speed Networks with 2D Hash Tables", in Proc. of Field-Programmable Logic and its Applications (FPL), Antwerp, Belgium, Aug.-Sep. 2004, 5 pages.

A. Shye, Y. Pan, B. Scholbrock, J. S. Miller, G. Memik, P. Dinda, R. Dick, "Power to the People: Leveraging Human Physiological Traits to Control Microprocessor Frequency", in Proc. of International Symposium on Microarchitecture (MICRO), Lake Como, Italy, Nov. 2008, 12 pages.

A. Shye, B. Ozisikyilmaz, A. Mallik, G. Memik, P. Dinda, R. Dick, A. Choudhary, "Learning and Leveraging the Relationship between Architecture-Level Measurements and Individual User Satisfaction", in Proc. of International Symposium on Computer Architecture (ISCA), Beijing, China, Jun. 2008, 12 pages.

A. Mallik, J. Cosgrove, R. Dick, G. Memik, P. Dinda, "PICSEL: Measuring User-Perceived Performance to Control Dynamic Frequency Scaling", in Proc. of Architectural Support for Programming Languages and Operating Systems (ASPLOS), Seattle, WA, Mar. 2008, pp. 70-79.

P. Dinda, G. Memik, R. Dick, B. Lin, A. Mallik, A. Gupta, S. Rossoff, "The User in Experimental Computer Systems Research", in Proc. of FCRC Workshop on Experimental Computer Science (ExpCS), San Diego, CA, Jun. 2007, pp. 1-12.

Arindam Mallik, Bin Lin, Gokhan Memik, Peter Dinda, Robert Dick, "User-Driven Frequency Scaling", IEEE Computer Architecture Letters (CAL), vol. 5, No. 2, 2006, 4 pages.

R. Schweller, Z. Li, Y. Chen, Y. Gao, A. Gupta, Y. Zhang, P. Dinda, M. Kao, G. Memik, "Reversible Sketches: Enabling Monitoring and Analysis over High-speed Data Streams", IEEE/ACM Transactions on Networking (ToN), vol. 15, No. 5, Oct. 2007, pp. 1059-1072.

R. Schweller, Z. Li, Y. Chen, Y. Gao, A. Gupta, Y. Zhang, P. Dinda, M. Kao, G. Memik, "Reverse Hashing for High-speed Network Monitoring: Algorithms, Evaluation, and Applications", in Proc. of 25th Annual Joint Conference of the IEEE Computer and Communications Societies (INFOCOM), Barcelona, Spain, Apr. 2006, 12 pages.

A. Mallik, B. Lin, P. Dinda, G. Memik, R. Dick, "Process and User Driven Dynamic Voltage and Frequency Scaling". Tech. Rep. NWU-EECS-06-11, Department of Electrical Engineering and Computer Science, Northwestern University, Aug. 2006, 18 pages.

Ja Chun Ku, Serkan Ozdemir, Gokhan Memik, Yehea Ismail, "Thermal Management of On-Chip Caches through Power Density Minimization", IEEE Transactions on Very Large Scale Integration Systems (VLSI), vol. 15, Issue 5, pp. 592-604, May 2007.

J. C. Ku, S. Ozdemir, G. Memik, Y. Ismail, "Power Density Minimization for Highly-Associative Caches in Embedded Processors", in Proc. of Great Lakes Symposium on VLSI (GLSVLSI), Philadelphia, PA, Apr.-May 2006, pp. 100-104.

J. C. Ku, S. Ozdemir, G. Memik, Y. Ismail, "Thermal Management of On-Chip Caches Through Power Density Minimization", in Proc. of International Symposium on Microarchitecture (MICRO), Barcelona, Spain, Nov. 2005, 11 pages.

Y. Liu, G. Memik, G. Reinman, "Reducing the Energy of Speculative Instruction Schedulers", in Proc. of International Conference on Computer Design (ICCD), San Jose, CA, Oct. 2005, 6 pages.

Y. Liu, A. Shayesteh, G. Memik, G. Reinman, "Tornado Warning: the Perils of Selective Replay in Multithreaded Processors", in Proc. of International Conference on Supercomputing (ICS), Boston, MA, Jun. 2005, 10 pages.

G. Chen, Mahmut T. Kandemir, Mary Jane Irwin, Gokhan Memik, "Compiler-directed selective data protection against soft errors". ASP-DAC 2005: 713-716.

Rajarshi Mukherjee, Seda Ogrenci Memik, Gokhan Memik, "Temperature-aware resource allocation and binding in high-level synthesis". DAC 2005: 196-201.

Gokhan Memik, Glenn Reinman, William H. Mangione-Smith, "Precise Instruction Scheduling", Journal of Instruction-Level Parallelism (JILP), vol. 7, Jan. 2005, pp. 1-21.

Y. Liu, A. Shayesteh, G. Memik, G. Reinman, "The Calm Before the Storm: Reducing Replays in the Cyclone Scheduler", in Proc. of P=ac2: First Watson Conference on Interaction between Architecture, Circuits, and Compilers (P=ac2), Yorktown Heights, NY, Oct. 2004, 8 pages.

Y. Liu, A. Shayesteh, G. Memik, G. Reinman, "Scaling the Issue Window with Look-Ahead Latency Prediction", In Proc. of International Conference on Supercomputing (ICS), Saint-Malo, France, Jun.-Jul. 2004, pp. 217-226.

Rajarshi Mukherjee, Seda Ogrenci Memik, Gokhan Memik, "Peak temperature control and leakage reduction during binding in high level synthesis", ISLPED 2005: 251-256.

Gokhan Memik, Mahmut T. Kandemir, Ozcan Ozturk, "Increasing Register File Immunity to Transient Errors", Date 2005: 586-591.

Gokhan Memik, Masud H. Chowdhury, Arindam Mallik, Yehea I. Ismail, "Engineering Over-Clocking: Reliability-Performance Trade-Offs for High-Performance Register Files". DSN 2005: 770-779.

Arindam Mallik, Gokhan Memik, "A Case for Clumsy Packet Processors", MICRO 2004: 147-156.

Gokhan Memik, Mahmut T. Kandemir, Alok N. Choudhary, Ismail Kadayif, "An Integrated Approach for Improving Cache Behavior", Date 2003: 10796-10801.

Gokhan Memik, William H. Mangione-Smith, "Increasing power efficiency of multi-core network processors through data filtering", CASES 2002: 108-116.

Gokhan Memik, Mahmut T. Kandemir, Wei-Keng Liao, Alok Choudhary, "Multi-Collective I/O: A technique for exploiting inter-file access patterns", ACM Transactions on Storage (ToS), vol. 2, Issue 3, pp. 349-369, Aug. 2006.

G. Memik, M. Kandemir, A. Mallik, "Load Elimination for Low-Power Embedded Processors", in Proc. of Great Lakes Symposium on VLSI (GLSVLSI), Chicago, IL, Apr. 2005, pp. 282-285.

Gokhan Memik, Mahmut T. Kandemir, Alok N. Choudhary, "Exploiting Inter-File Access Patterns Using Multi-Collective I/O", FAST 2002: 245-258.

Gokhan Memik, Glenn Reinman, William H. Mangione-Smith, "Just Say No: Benefits of Early Cache Miss Determination", in Proc. of Ninth International Symposium on High Performance Computer Architecture (HPCA), Anaheim, CA, Feb. 2003, 10 pages.

G. Memik, G. Reinman, W. H. Mangione-Smith, "Reducing Energy and Delay Using Efficient Victim Caches", in Proc. of International Symposium on Low Power Electronics and Design (ISLPED), Seoul, Korea, Aug. 2003, 262-265.

S. O. Memik, G. Memik, R. Jafari, E. Kursun, "Global Resource Sharing for Synthesis of Control Data Flow Graphs on FPGAs", in Proc. of 40th Design Automation Conference (DAC), Anaheim, CA, Jun. 2003, pp. 604-609.

Gokhan Memik and William H. Mangione-Smith, "NEPAL: A Framework for Efficiently Structuring Applications for Network Processors", in Proc. of Second Workshop on Network Processors (NP), held in conjunction with HPCA, Anaheim, CA, Feb. 2003, 13 pages.

Andreas Moshovos, Gokhan Memik, Babak Falsafi, Alok Choudhary, "JETTY: Filtering Snoops for Reduced Energy Consumption in SMP Servers", in the Proc. of Seventh International Symposium on High Performance Computer Architecture (HPCA), Monterey, Mexico, Jan. 2001, 12 pages.

Gokhan Memik, Mahmut T. Kandemir, Alok Choudhary, "Design and Evaluation of a Smart Disk Cluster for DSS Commercial

(56) References Cited

OTHER PUBLICATIONS

Workloads", Journal of Parallel and Distributed Computing (JPDC), vol. 61, Issue 11, pp. 1633-1664, 2001.

Gokhan Memik, Mahmut T. Kandemir, Alok N. Choudhary, "Design and Evaluation of a Compiler-Directed Collective I/O Technique", Euro-Par 2000: 1263-1272.

S. Borkar, T. Karnik, S. Narendra, J. Tschanz, A. Keshavarzi, and V. De, "Parameter variations and impact on circuits and microarchitecture," in Design Automation Conference, Jun. 2003, pp. 338-342.

J. Dorsey, S. Searles, M. Ciraula, S. Johnson, N. Bujanos, D. Wu, M. Braganza, S. Meyers, E. Fang, and R. Kumar, "An integrated quadcore Opteron processor," in International Solid State Circuits Conference, Feb. 2007, pp. 102-103.

E. Humenay, D. Tarjan, and K. Skadron, "Impact of process variations on multicore performance symmetry," in Design, Automation and Test in Europe, Apr. 2007, pp. 1653-1658.

R. McGowen, C. A. Poirier, C. Bostak, J. Ignowski, M. Millican, W. H. Parks, and S. Naffziger, "Power and temperature control on a 90-nm Itanium family processor," Journal of Solid-State Circuits, Jan. 2006.

Alex Shye, Lei Yang, Xi Chen, Berkin Ozisikyilmaz, Arindam Mallik, Bin Lin, Peter A. Dinda, Gokhan Memik, Robert P. Dick, "Empathic Computer Architectures and Systems", in Architectural Support for Programming Languages and Operating Systems (ASPLOS)—Wild and Crazy Ideas VI (ASPLOS-WACI), Seattle, WA, Mar. 2008, 1 page.

Bloom filter "Wikipedia", http://en.wikipedia.org/w/index.php?title=Bloom_filter&printable=yes, Jul. 13, 2009, 10 pages.

Onur Mutlu and Thomas Moscibroda, "Parallelism-Aware Batch Scheduling: Enhancing both Performance and Fairness of Shared DRAM Systems," ISCA, pp. 63-74, 2008 (2008 International Symposium on Computer Architecture).

Skadron, K. et al., "Temperature-Aware Microarchitecture", Published in the Proceedings of the 30th International Symposium on Computer Architecture, pp. 1-12, Jun. 9-11, 2003.

Chung-Hsiang Lin, Chia-Lin Yang, Ku-Jei King, "PPT Joint performance/power/thermal management of DRAM memory for multi-core systems", Proceedings of the 14th ACM/IEEE International Symposium on Low Power, Electronics and Design (ISLPED), Aug. 2009, pp. 93-98.

Hong, S. et al., "Process Variation Aware Thread Mapping for Chip Multiprocessors", 978-3-9810801-5-5/DATE09 © 2009 EDAA, 6 pages.

Chen, R. et al., "Toward Secure Distributed Spectrum Sensing in Cognitive Radio Networks", the paper was presented in part in the First IEEE Workshop on Networking Technologies for Software Defined Radio (SDR) Networks, Sep. 2006, Reston, VA., 11 pages.

R. Chen, J.-M. Park, and K. Bian, "Robust distributed spectrum sensing in cognitive radio networks," IEEE Infocom 2008 mini-conference, Apr. 2008, 9 pages.

R. Bitirgen, E. Ipek, and J.F. Martínez, "Coordinated Management of Multiple Interacting Resources in Chip Multiprocessors: A Machine Learning Approach", Proc. of Intl. Symposium on Microarchitecture, Lake Como, Italy, Nov. 2008, 12 pages.

Chang Joo Lee, Onur Mutlu, Veynu Narasiman, and Yale N. Patt, "Prefetch-Aware DRAM Controllers", Proceedings of the 41st International Symposium on Microarchitecture (MICRO), pp. 200-209, Lake Como, Italy, Nov. 2008.

Onur Mutlu and Thomas Moscibroda, "Stall-Time Fair Memory Access Scheduling for Chip Multiprocessors", Proceedings of the 40th International Symposium on Microarchitecture (MICRO), pp. 146-158, Chicago, IL, Dec. 2007.

A. Das, S. Misra, S. Joshi, J. Zambreno, G. Memik and A. Choudhary. "An Efficient FPGA Implementation of Principal Component Analysis based Network Intrusion Detection System." In Proc. of Design, Automation & Test in Europe (DATE), Munich, Germany, Mar. 2008, pp. 1160-1165.

Arindam Mallik and Gokhan Memik, "Low Power Correlating Caches for Network Processors", Journal of Low Power Electronics (JOLPE), vol. 1, No. 2, pp. 108-118, Aug. 2005, pp. 1-21.

Biswass et al., "Combining Static and Dynamic Defect-Tolerance Techniques for Nanoscale Memory Systems", Nov. 2007, ICCAD 2007, 6 pages.

Chun et al., "Shapeshifter: Dynamically Changing Pipeline Width and Speed to Address Process Variations", Nov. 2008, MICRO 2008, pp. 411-422, 12 pages.

Kannan et al., "Power Reduction of Functional Units Considering Temperature and Process Variations", Jan. 2008, Proceedings of the 21st International Conference on VLSI Design, 6 pages.

International Search Report dated Nov. 12, 2010 in International Application No. PCT/US10/39939.

International Search Report dated Nov. 19, 2010 in International Application No. PCT/US10/39933.

* cited by examiner

SCHEDULING THREADS ON DIFFERENT PROCESSOR CORES BASED ON MEMORY TEMPERATURE

REFERENCE TO RELATED APPLICATIONS

This application is related to the following co-pending application, application Ser. No. 12/508,552 entitled "Core Selection For Applications Running On Multiprocessor Systems Based On Core and Application Characteristics" filed Jul. 23, 2009.

BACKGROUND

Power density in microprocessors doubles every few years, and this rate of increase is expected to continue growing. Energy consumed by the microprocessor is converted into heat, and so the growth in power density results in a corresponding rise in heat density, leading to difficulties in reliability and manufacturing costs. Localized heating occurs faster than chip-wide heating, because power dissipation is spatially non-uniform. The resulting "hot spots" further compound the rise in heat density.

Design techniques to deal with the increasing heat density and hot spot have mostly focused on the thermal package, such as heat sinks and fans. Temperature-aware design, at all system levels including the chip architecture level, has also been considered. Temperature-aware design, which makes use of power-management techniques, may directly target the spatial and temporal behavior of operating temperature.

BRIEF DESCRIPTION OF THE DRAWINGS

The present disclosure can be better understood from the following description and appended claims, taken in conjunction with the following drawings. The components in the figures are not necessarily to scale, emphasis instead being placed upon illustrating the principles of the disclosed subject matter. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
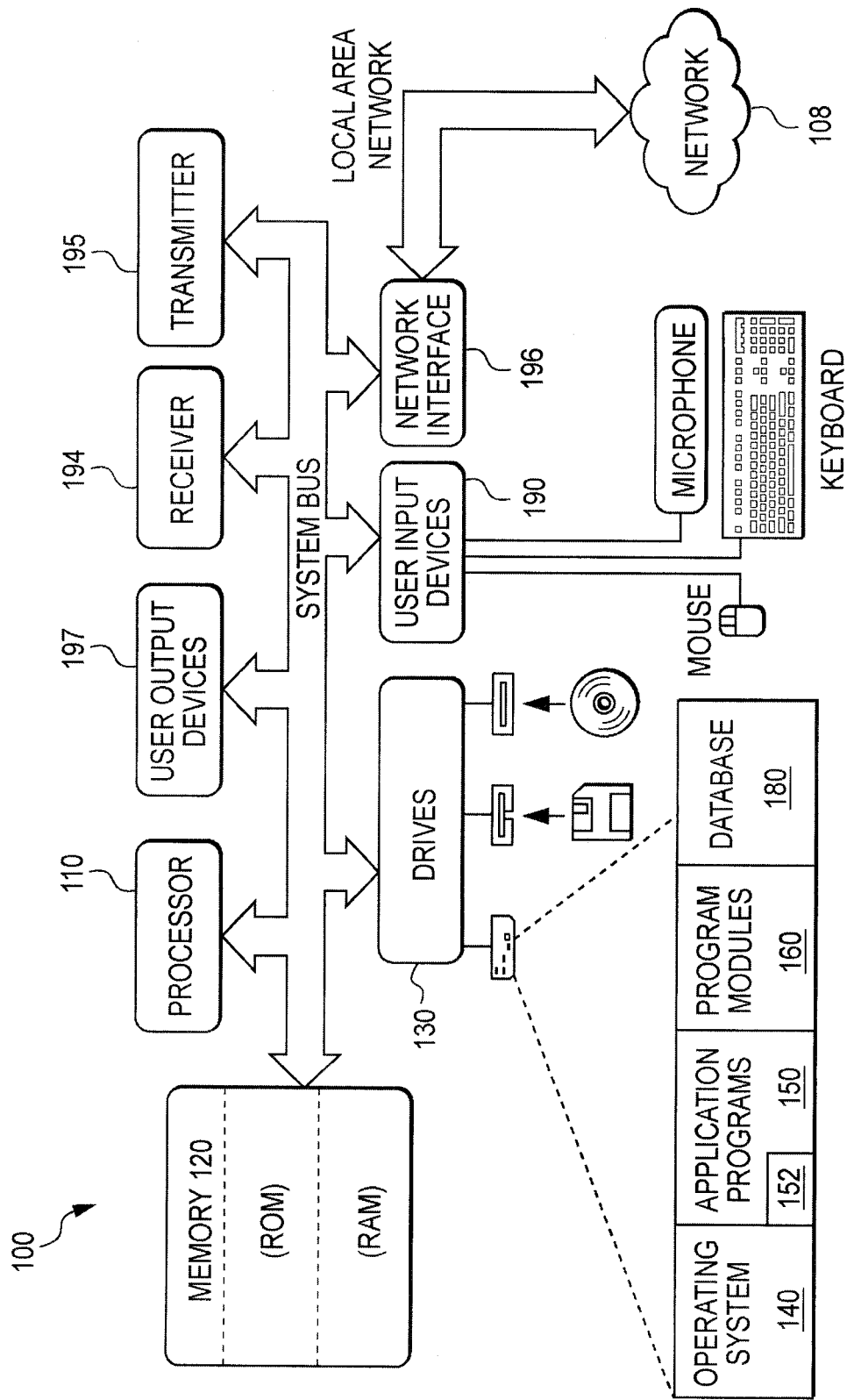
FIG. 1 illustrates a computer system arranged according to at least some embodiments of the present disclosure.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The present disclosure identifies that a DRAM memory system is a major shared resource among multiple processing cores in a CMP system. When accessing this shared resource, specific cores may be assigned to a specific application, or a specific thread within an application, for execution. Each application, or thread, may generate requests for data within memory, and specifically, within a specific memory bank within the memory. Too many requests for data within a specific memory bank may result in overheating of that specific memory bank, and ultimately an operating failure of that memory bank. The operating system may slow down a specific core, or cores, which may be making too many requests to a specific memory bank, in order to prevent overheating of that specific memory bank.

In light of the present disclosure, it is recognized that it may be suboptimal to slow down specific cores in order to prevent overheating of memory banks, since the cores may still be used for other tasks which do not require access to memory banks. As a result, the present disclosure recognizes that it may be desirable to prevent overheating of memory banks without having to slow down specific cores.

The present disclosure may make use of the discovery that by scheduling applications, or threads within applications, in response to the operating temperature of memory banks used by those applications or threads, overheating of memory banks may be prevented without having to slow down specific cores.

FIG. 1 illustrates a computer system arranged according to at least some embodiments of the present disclosure. FIG. 1 illustrates a computer 100 including a processor 110, memory 120 and one or more drives 130. The drives 130 and their associated computer storage media may be configured to provide storage of computer readable instructions, data structures, program modules and other data for the computer 100. Drives 130 may include an operating system 140, application programs 150, program modules 160, and database 180. Operating system 140 and/or application programs 150, for example, may include program instructions for causing the computer 100 to carry out the functions and/or operations specified in FIG. 4, for example, thread scheduling algorithm 152. Computer 100 may include user input devices 190 through which a user may enter commands and data. Input devices may include an electronic digitizer, a microphone, a keyboard and pointing device, commonly referred to as a mouse, trackball or touch pad. Other input devices may include a joystick, game pad, satellite dish, scanner, or the like.

These and other input devices may be coupled to processor 110 through a user input interface that may be coupled to a system bus or it may be connected by other interface or bus structures, such as a parallel port, game port or a universal serial bus (USB), or the like. Computer 100 may include peripheral output devices such as speakers, a printer, or a display 202, which may be connected through an output peripheral interface 194 or the like.

Computer 100 may be configured to operate in a networking environment using logical connections to one or more computers, such as a remote computer connected to network interface 196 The remote computer may be a personal computer (PC), a server, a router, a network PC, a peer device or other common network node, and may include many or all of the elements described above relative to computer 100.

Networking environments may include offices, enterprise-wide area networks (WAN), local area networks (LAN), intranets and the Internet. In an example, computer 100 may be the source machine from which data is being migrated and the remote computer may comprise the destination machine, or vice versa. Source and destination machines may not be connected by a network 108 or any other means, but instead, data may be migrated via any media capable of being written by the source platform and read by the destination platform or platforms. In a LAN or WLAN networking environment, computer 100 may be connected to the LAN or WAN through a network interface 196 or an adapter. In a WAN networking environment, computer 100 may include a modem or other means for establishing communications over the WAN, such as the Internet or network 108. Other means of establishing a communications link between the computers may be used.

A computer peripheral may include any device coupled to the processor 110 and the memory 120 of the computer 100 through the system bus. A computer peripheral may include any device connected with the output peripheral interface, including the display 202, the printer, or speakers, drives 130, user input devices 190 such as the keyboard, the mouse, and the microphone, and the network interface 196. Components of the computer peripheral may include any device within a computer peripherals which may use power and may be any device, such as speakers, lighting elements such as light emitting diodes, or backlights used to provide lighting for displays, display elements, such as LCD, LED, OLED, CRT, or Plasma displays, or semiconductor chips such as a central processing unit (CPU), a graphic processing unit (GPU), memory. According to an embodiment, computer 100 may be connected in a networking environment such that the processor 110 and/or program modules 160 may perform power reduction and conservation with minimal detriment to the user experience.

In some examples, methods for scheduling a thread running in a computer system may be disclosed. The computer system (e.g., computer 100) may include a multiprocessor having first and second cores, an operating system, and/or a memory bank for storing data. The methods may include measuring a temperature of the memory bank and determining whether the thread includes a request for data stored in the memory bank, if the temperature of the memory bank exceeds a predetermined temperature. The methods may include slowing down the execution of the thread upon determining if the thread includes a request for data.

In further examples, methods may be described for scheduling a thread running in a computer system, where the computer system (e.g., computer 100) may include a multiprocessor having first and second cores, an operating system, and first and second memory banks for storing data. The methods may include measuring a first temperature of the first memory bank and a second temperature of the second memory bank and determining if any of the first and second temperatures exceeds a predetermined temperature. The methods may include slowing down the execution of the thread upon determining if the thread includes a request for data in a memory bank whose temperature exceeds the predetermined temperature.

In other examples, methods for scheduling a thread running in a computer system may be described where the computer system (e.g., computer 100) may include a multiprocessor having first and second cores, an operating system, and a memory bank for storing data. A temperature of the memory bank may exceed a predetermined temperature. The methods may include using the operating system to slow down the execution of the thread.

Figure 2:
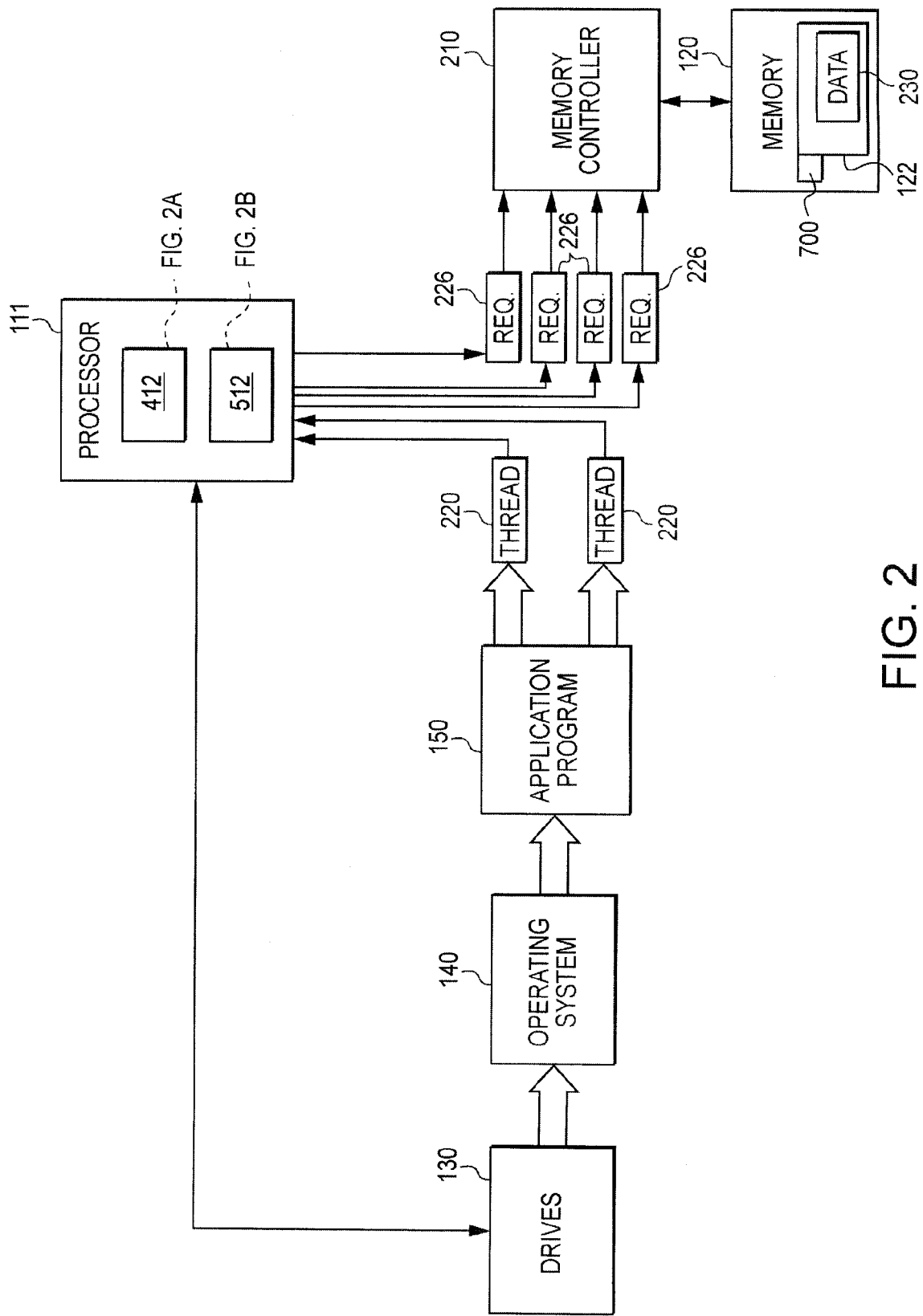
FIG. 2 illustrates an application program being executed by an operating system in accordance with at least embodiments of the present disclosure.

FIG. 2 illustrates an application program being executed by an operating system arranged in accordance with at least some embodiments of the present disclosure. As shown in FIG. 2, operating system 140 may execute an application program 150 from drives 130. Operating system 140 and/or application programs 150, for example, may include program instructions for causing the computer 100 to carry out the functions and/or operations specified in FIG. 4. Application program 150 may be any application, program, portion of a program, or thread, which may be executed by operating system 140 in multiprocessor 111. Application program 150 may be arranged to load data 230 into memory 120 and accesses data 230 from memory 120 using a memory controller 210. Application program 150 may be arranged to run multiple sub-applications called threads 220 to accomplish a task, such as loading and accessing data 230 into and from memory bank 122 of memory 120 using one or more requests 226. Threads 220 may be executed by application program 150. Application program 150 may be arranged to divide the execution of a task into as many threads 220 as application programs deems necessary to accomplish that task. For example, if application program 150 is a word processing program with a document having multiple pages, and application program 150 may be configured to accomplish the task of spell checking each page of the document, application program 150 may divide the task of spell checking the document into multiple threads 220 such that each thread 220 may spell check a portion of the document. Each thread 220 may be sent to multiprocessor 111 for execution. When executed within the multiprocessor 111, each thread 220 may be adapted to produce requests 226 for data 230 within memory 120. The requests 226 may be sent to memory controller 210, which may organize the requests 226 so that multiprocessor 111 may be configured to operate efficiently.

In some embodiments, as shown in FIG. 2, multiprocessor 111 may include processors that may simultaneously execute more than one thread 220. Multiprocessor 111 may include multiple processors known as cores 412 and 512, or a single processor (only one of 412 or 512) which may run multiple threads 220 simultaneously, also known as a multithreaded processor. FIG. 2 illustrates an example multiprocessor 111 including two cores 412 and 512, but is not limited to any particular number of cores. The term "core" may be used herein to refer to any device which may process a single thread and may refer to a processor or a portion within a processor that may process a single thread. A multithreaded processor may be referred to as a processor having multiple cores. A computer 100 having multiple processors may be referred to herein as a computer 100 having multiple cores. Also present is a temperature sensor 700, for example, a thermocouple or a liquid thermometer, for measuring the temperature of the memory bank 122.

Figure 3:
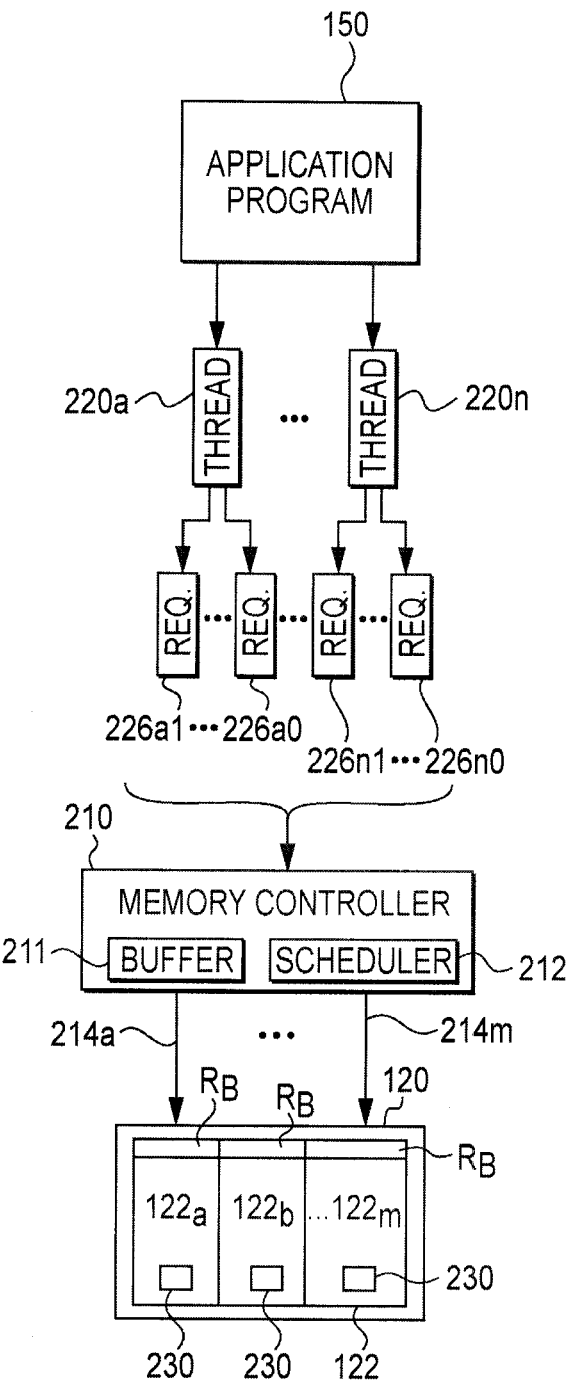
FIG. 3 illustrates a schematic representation of an application program being divided into threads which issue requests sent to a memory controller in accordance with at least some embodiments of the present disclosure.

FIG. 3 illustrates a schematic representation of an application program being divided into threads which issue requests sent to a memory controller in accordance with at least some embodiments of the present disclosure. As shown in FIG. 3, application 150 may be divided into multiple threads $220_a$-$220_n$, where n may represent the number of threads 220, and wherein each thread may perform a task for application 150 and may be executed on, for example, multiprocessor 111 of FIG. 2. The multiprocessor may be configured to receive and execute multiple threads $220_a$-$220_n$, individually or simultaneously, from application program 150. Each thread 220 executed on the multiprocessor may be executed independently from each other thread 220 and may issue multiple requests $226_{a1}$-$226_{no}$ for data 230 stored in memory 120, where the first index (a . . . n) may represent the thread 220 associated with the request 226, and the second index (1 . . . o) may represent the number of requests 226 associated with a particular thread 220.

Each thread 220 may issue requests 226 for data 230 stored in memory 120, and in an example, for data 230 stored in memory banks $122_a$-$122_m$ within memory 120, where the index (a, b . . . m) may represent the number of memory banks 122. Memory 120 may include multiple memory banks $122_a$ to $122_m$ that may be configured to allow multiple outstanding memory requests 226 to proceed in parallel if they require data 230 from different memory banks. As a result, first memory bank $122_a$ and second memory bank $122_b$ may be accessed simultaneously by memory controller 210 upon receiving a request 226 for data 230.

Each memory bank 122 may be a two-dimensional array, including columns $C_1$ to $C_i$, where the index (1 . . . i) may represent the number of columns, and rows $R_1$ to $R_j$, where the index (1 . . . j) may represent the number of rows. Rows may store data in consecutive memory locations and may be, for example, approximately 1-2 kilobytes (KB) in size. The data 230 in a memory bank 122 may be accessed from a row-buffer $R_B$, which may contain at most one row. In an example, each memory bank 122 may contain one row-buffer $R_B$. The time it takes to service each request 226 for data 230 may depend on the status of each row-buffer $R_B$ and may fall into one of three categories. The first category may be row hit, where a request 226 may be to a row that may be currently open in each row-buffer $R_B$, allowing the memory controller 210 to issue only a read or write command to the respective memory bank 122, resulting in a bank access latency of $t_{CL}$.

The second category may be row closed, where there may be no open row in a row-buffer $R_B$, so that the memory controller 210 may need to first issue an activate command to open a required row and then a read/write command, resulting in a total latency of $t_{RCD}+t_{CL}$, where $t_{RCD}$ is the latency for the activate command and $t_{CL}$ is the latency for the read/write command. The third category may be row conflict, where a request 226 may be to a row different from the one currently in a respective row-buffer $R_B$, so that the memory controller 210 needs to first issue a precharge command and open the required row (by activating it), and issue a read/write command for data in the required row. These accesses may incur the highest total latency of $t_{RP}+t_{RCD}+t_{CL}$, where $t_{RP}$ is the latency for the row precharge (to close it), $t_{RCD}$ is the latency for the activate command and $t_{CL}$ is the latency for the read/write command.

Memory controller 210 may be arranged in communication with memory 120 and the multiprocessor and may be located anywhere along the system, including within the multiprocessor. Memory controller 210 may include a memory request buffer 211 that may be arranged to buffer the requests 226 and the data 230 while the requests 226 may be waiting to be serviced. Memory controller 210 may include a scheduler 212 that may be arranged to select the next request 226 to be serviced [6,2,3]. In some embodiments, scheduler 212 may have two-levels. When selecting the next request 226 to be serviced, the scheduler 212 may be configured to consider the state of the memory banks $122_a$-$122_m$ and the state of memory buses $214_a$-$214_m$ connecting the memory controller 210 to each memory bank 122, and the state of a request 226. A memory command for a request 226 may be scheduled by the scheduler 212 if its scheduling does not cause any resource, such as memory banks $122_a$-$122_m$ and address/data/system bus, conflicts and does not violate any memory timing constraints. A memory command which does not cause any conflicts may be considered to be ready.

In some embodiments, computer 100 may include a multiprocessor 110 or 111, that may have multiple cores 412 and 512, and a memory bank 122, as shown in FIGS. 1, 2 and 3.

Figure 4:
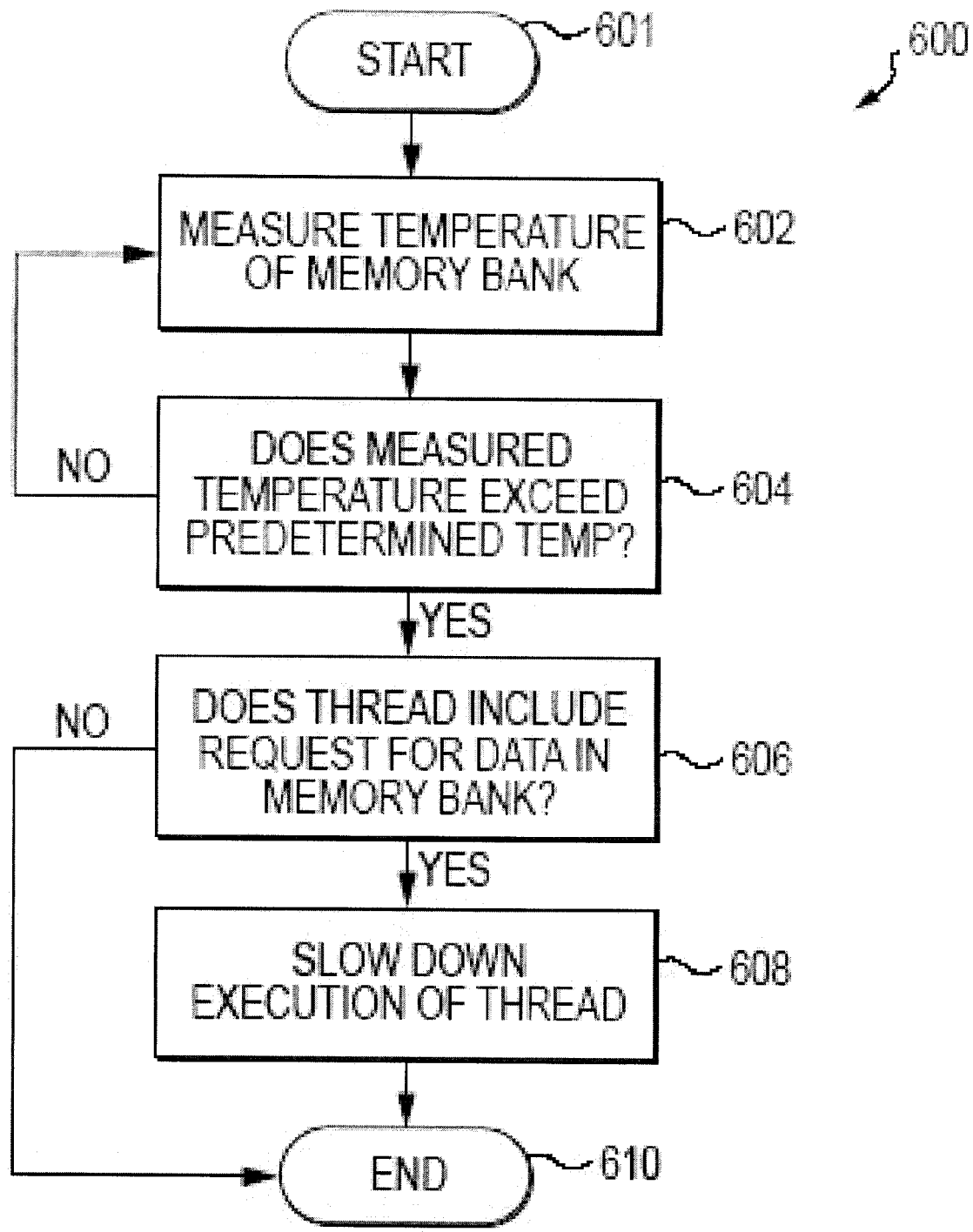
FIG. 4 illustrates a flowchart arranged in accordance with at least some embodiments of the present disclosure.

FIG. 4 illustrates a flowchart in accordance with at least some embodiments of the present disclosure. As illustrated, to prevent overheating the memory banks or to minimize power usage, the scheduling of threads may be controlled by the operating system or an application program using a thread scheduling algorithm 600. Thread scheduling algorithm 600 may be initiated at block 601. Thread scheduling algorithm 600 may be initiated by the operating system or an application program.

Upon initiating thread scheduling algorithm 600, the temperature of the memory bank may be measured at block 602. The temperature may be measured using a remote sensor on the memory bank that may measure temperature or an embedded sensor within the memory bank that may measure temperature. The sensor may be any temperature sensor, for example, a thermocouple or a liquid thermometer. The thread scheduling algorithm 600 may be arranged to determine if the measured temperature exceeds a predetermined temperature, at block 604.

The predetermined temperature may be either the temperature beyond which the memory bank fails to operate reliably or the temperature beyond which thermal damage to the memory bank may occur; operating the memory bank, and therefore the memory, at a temperature which exceeds the predetermined temperature may be harmful to the memory and the memory bank, and may reduce the reliability of the data stored within the memory banks. Alternatively, the predetermined temperature may be the maximum temperature at which the memory bank operates reliably. When minimizing power usage, the predetermined temperature may be set by the user, or may be selected by the user, an application program or the operating system, from a sliding scale predetermined by the manufacturer, and may be, for example, indicative of various power usage levels.

If the measured temperature does not exceed a predetermined temperature, the thread scheduling algorithm 600 may return from block 604 to block 602. If the temperature of the memory bank exceeds the predetermined temperature, the thread scheduling algorithm 600 may proceed from block 604 to block 606. At block 606 the thread scheduling algorithm 600 may determine if the thread includes a request for data in the memory bank. If the thread is determined to include a request for data in the memory bank, and the temperature of the memory bank exceeds the predetermined temperature, then the thread scheduling algorithm 600 may slow down the execution of the thread, at block 608. If the thread does not include a request for data in the memory bank, then the thread scheduling algorithm 600 may end at block 610.

The thread scheduling algorithm 600 may slow down the execution of threads in a number of ways. In some embodiments, the first and second cores 412, 512 (FIG. 2) may be arranged to execute first and second task sets. Each task set may include a single thread or a plurality of threads. The thread scheduling algorithm 600 may be adapted to slow down the execution of a thread by determining which of the first and second task sets may be expected to be completed first and scheduling the thread to run on the core executing the task set that may not be expected to be completed first.

In some embodiments, the thread scheduling algorithm 600 may be adapted to slow down the execution of a thread by reducing the priority of execution of the thread. For example, operating systems typically assign each thread a priority value, such as a value of 1-5 or 1-100, with a greater value corresponding to a higher priority; the higher the priority, the greater the fraction of core time devoted to execution of the thread. The amount of the reduction of the priority value, for example, may be a fraction of the priority value, such as approximately 1% to 99%, including approximately 10%, 20%, 30%, 40%, 50%, 60%, 70%, 80% and 90% of the priority value. Alternatively, the priority value may be reduced by a single priority value unit, or the priority value may be reduced to the smallest priority value.

In some embodiments, the thread scheduling algorithm 600 may be adapted to slow down the execution of a thread by delaying the scheduling of the thread to run on a core, for example, by delaying the scheduling of the thread to run on one of the first and second cores 412, 512 (FIG. 2) and scheduling the thread to run on one of the first and second cores 412, 512 (FIG. 2) after the delay. The amount of the delay may be, for example, a fraction of the time the thread would nominally take to execute, such as approximately 1% to 99%, including approximately 10%, 20%, 30%, 40%, 50%, 60%, 70%, 80% and 90%. Alternatively, the amount of the delay may be, for example, a multiple of the amount of time the thread would nominally take to execute, such as 1 to 1000 multiples of the time the thread would nominally take to execute, including approximately 2, 5, 10, 15, 20, 50, 100, 200, 500, 600, 700, 800 and 900 multiples of the time the thread would nominally take to execute.

In some embodiments, upon slowing down the execution of a thread, the thread scheduling algorithm 600 may be adapted to re-measure the temperature of the memory bank, for example by starting thread scheduling algorithm 600 again. If the temperature of the memory bank is less than the predetermined temperature, the thread scheduling algorithm 600 may be adapted to schedule the thread in cores without slowing down the execution of the thread.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the disclosed subject matter may be implemented as a combination of both software (e.g., a computer program product) and hardware. Still other embodiments of the disclosed subject matter are implemented as entirely hardware, or entirely software (e.g., a computer program product).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments of the disclosed subject matter have been described, it will be apparent to those of ordinary skill in the art that other embodiments and implementations are possible within the scope of the disclosure. Accordingly, the disclosed subject matter is not to be restricted except in light of the attached claims and their equivalents.

The invention claimed is:

1. A method of scheduling execution of a thread in a computer system, the method comprising:
   receiving a request to execute the thread;
   scheduling the thread to be executed according to a first schedule on a first core;
   obtaining a measurement of a temperature of a memory bank in the computer system;
   determining whether the temperature of the memory bank exceeds a threshold temperature;
   determining whether the thread includes a request for data stored in the memory bank; and
   in response to the determination that the temperature of the memory bank exceeds the threshold temperature and in response to the determination that the thread includes a request for data stored in the memory bank, scheduling execution of the thread on a second core different from the first core and according to a second schedule with a delayed execution for the thread relative to the first schedule.

2. The method of claim 1, further comprising, prior to the scheduling execution,
   determining that a first task set executing on the first core will be completed prior to a second task set executing on the second core.

3. The method of claim 1, wherein the thread has a priority value, and the scheduling execution of the thread includes reducing the priority value.

4. The method of claim 3, wherein the reducing of the priority value comprises reducing the priority value to a smallest priority value.

5. The method of claim 3, wherein the reducing of the priority value comprises reducing the priority value approximately 1% to approximately 99%.

6. The method of claim 1, wherein:
   the scheduling execution of the thread is carried out by an operating system
   the computer system comprises computer-readable media, operably coupled to the first and second cores, and
   the operating system is encoded in the computer-readable media.

7. The method of claim 1, wherein the scheduling execution of the thread comprises scheduling the thread to run on the second core after a delay.

8. The method of claim 7, wherein the delay is approximately 1 to approximately 1000 multiples of a time the thread would take to execute without the delay.

9. The method of claim 1, wherein the threshold temperature is an approximately maximum temperature at which the memory bank operates reliably.

10. The method of claim 1, wherein:
    the threshold temperature is selected by an application program from a sliding scale indicative of power usage levels, and
    the computer system comprises computer-readable media, operably coupled to the first and second cores, and
    the application program is encoded in the computer-readable media.

11. The method of claim 1, wherein the temperature is measured by a thermocouple.

12. A non-transitory computer program product comprising software encoded in computer-readable media, to schedule running of a thread in a computer system, the software comprising instructions, operable when executed, to:
    schedule a thread to be executed according to a first schedule on a first core;
    obtain a measurement of a temperature of a memory bank in a computer system;
    determine whether the temperature of the memory bank exceeds a threshold temperature;
    determine whether the thread includes a request for data stored in the memory bank; and
    in response to the determination that the temperature of the memory bank exceeds the threshold temperature and in response to the determination that the thread includes a request for data stored in the memory bank, schedule execution of the thread on a second core different from the first core and according to a second schedule with a delayed execution for the thread relative to the first schedule.

13. The non-transitory computer program product of claim 12, comprising instructions, operable when executed, to:
    determine, prior to the schedule of execution, that a first task set executing on the first core will be completed prior to a second task set executing on the second core.

14. The non-transitory computer program product of claim 12, wherein the instructions to schedule execution of the thread comprise instructions, operable when executed, to reduce a priority value of the thread.

15. The non-transitory computer program product of claim 14, wherein the instructions to reduce the priority value of the thread comprise instructions, operable when executed, to reduce the priority value of the thread approximately 1% to approximately 99%.

16. The non-transitory computer program product of claim 12, wherein the computer program product includes an operating system.

17. The non-transitory computer program product of claim 12, wherein the instructions to schedule execution of the thread comprise instructions, operable when executed, to schedule the thread to run on the second core after a delay.

18. A computer system, comprising:
    first and second cores, a memory bank, operably coupled to the first and second cores, computer-readable media, operably coupled to the first and second cores, wherein the computer-readable media includes computer executable instructions which when executed by the computer system configure the computer system to:

schedule a thread to be executed according to a first schedule on the first core;

obtain a measurement of a temperature of the memory bank;

determine whether the temperature of the memory bank exceeds a threshold temperature;

determine whether the thread includes a request for data stored in the memory bank; and in response to the determination that the temperature of the memory bank exceeds the threshold temperature and in response to the determination that the thread includes a request for data stored in the memory bank, schedule execution of the thread on the second core and according to a second schedule with a delayed execution for the thread relative to the first schedule.

19. The computer system of claim 18, further comprising a temperature sensor adapted to measure the temperature of the memory bank, wherein the temperature sensor is operably coupled to the first and second cores.

20. The computer system of claim 19, wherein the temperature sensor is a thermocouple.

\* \* \* \* \*

UNITED STATES PATENT AND TRADEMARK OFFICE
CERTIFICATE OF CORRECTION

PATENT NO. : 8,819,686 B2
APPLICATION NO. : 12/507952
DATED : August 26, 2014
INVENTOR(S) : Memik et al.

It is certified that error appears in the above-identified patent and that said Letters Patent is hereby corrected as shown below:

On Title Page 2, References Cited, item (56), under "OTHER PUBLICATIONS", in Column 2, Line 45, delete "Managerment" and insert -- Management --, therefor.

In the Drawings

In Fig. 3, Sheet 3 of 4, delete Tag "220a" and insert Tag -- $220_a$ --, therefor.

In Fig. 3, Sheet 3 of 4, delete Tag "220n" and insert Tag -- $220_n$ --, therefor.

In Fig. 3, Sheet 3 of 4, delete Tag "226a1...226a0" and insert Tag -- $226_{a1}...226_{a0}$ --, therefor.

In Fig. 3, Sheet 3 of 4, delete Tag "226n1...226n0" and insert Tag -- $226_{n1}...226_{n0}$ --, therefor.

In Fig. 3, Sheet 3 of 4, delete Tag "214a" and insert Tag -- $214_a$ --, therefor.

In Fig. 3, Sheet 3 of 4, delete Tag "214m" and insert Tag -- $214_m$ --, therefor.

In the Claims

In Column 9, Line 67, in Claim 6, delete "system" and insert -- system, --, therefor.

In Column 10, Line 18, in Claim 10, delete "levels, and" and insert -- levels, --, therefor.

Signed and Sealed this
Sixth Day of January, 2015

Michelle K. Lee
*Deputy Director of the United States Patent and Trademark Office*